United States Patent
Smith

(10) Patent No.: US 8,246,296 B2
(45) Date of Patent: Aug. 21, 2012

(54) ASPIRATED IMPELLER

(75) Inventor: Joseph Carl Smith, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 905 days.

(21) Appl. No.: 12/288,052

(22) Filed: Oct. 16, 2008

(65) Prior Publication Data

US 2010/0098553 A1  Apr. 22, 2010

(51) Int. Cl.
*F01D 5/14* (2006.01)
*F03D 11/00* (2006.01)
*F04D 31/00* (2006.01)

(52) U.S. Cl. ....... 415/115; 415/52.1; 415/116; 416/90 R

(58) Field of Classification Search ................. 415/56.3, 415/56.4, 57.3, 57.4, 108, 115, 116; 416/90 R, 416/91, 181, 182, 231 R
See application file for complete search history.

(56) References Cited

U.S. PATENT DOCUMENTS

| | | | |
|---|---|---|---|
| 3,749,520 A | | 7/1973 | Bandukwalla |
| 4,116,171 A | * | 9/1978 | Schulmeister et al. .... 123/41.57 |
| 4,152,092 A | * | 5/1979 | Swearingen ................. 415/58.2 |
| 4,205,942 A | * | 6/1980 | Yokoyama ..................... 415/106 |
| 5,143,513 A | | 9/1992 | Ellingson et al. |
| 5,167,678 A | * | 12/1992 | Elonen et al. .................... 96/214 |
| 5,224,821 A | * | 7/1993 | Ozawa ........................ 415/169.1 |
| 5,257,902 A | | 11/1993 | Atarashi et al. |
| 6,123,507 A | | 9/2000 | Weis |
| 2003/0021690 A1 | | 1/2003 | Algers |
| 2006/0034691 A1 | | 2/2006 | Lawlor et al. |
| 2006/0233647 A1 | | 10/2006 | Saunders |

* cited by examiner

*Primary Examiner* — David Nhu
(74) *Attorney, Agent, or Firm* — Krieg DeVault LLP

(57) ABSTRACT

In one embodiment, a centrifugal impeller is described having a front side with airfoils and a back side. A conduit may be formed between the front side and the back side, or any other side, and may convey pressurized working fluid between the two. The conduit may pass relatively high pressure working fluid between any two locations such as from the front side to the back side. The conduit may include an aperture located on the front side and an aperture located on the back side. Any number of conduits may be defined within the centrifugal impeller. Apertures located on the front side of the impeller may be formed in any suitable place, such as a hub of the impeller or an airfoil surface, to set forth just two non-limiting examples.

20 Claims, 6 Drawing Sheets

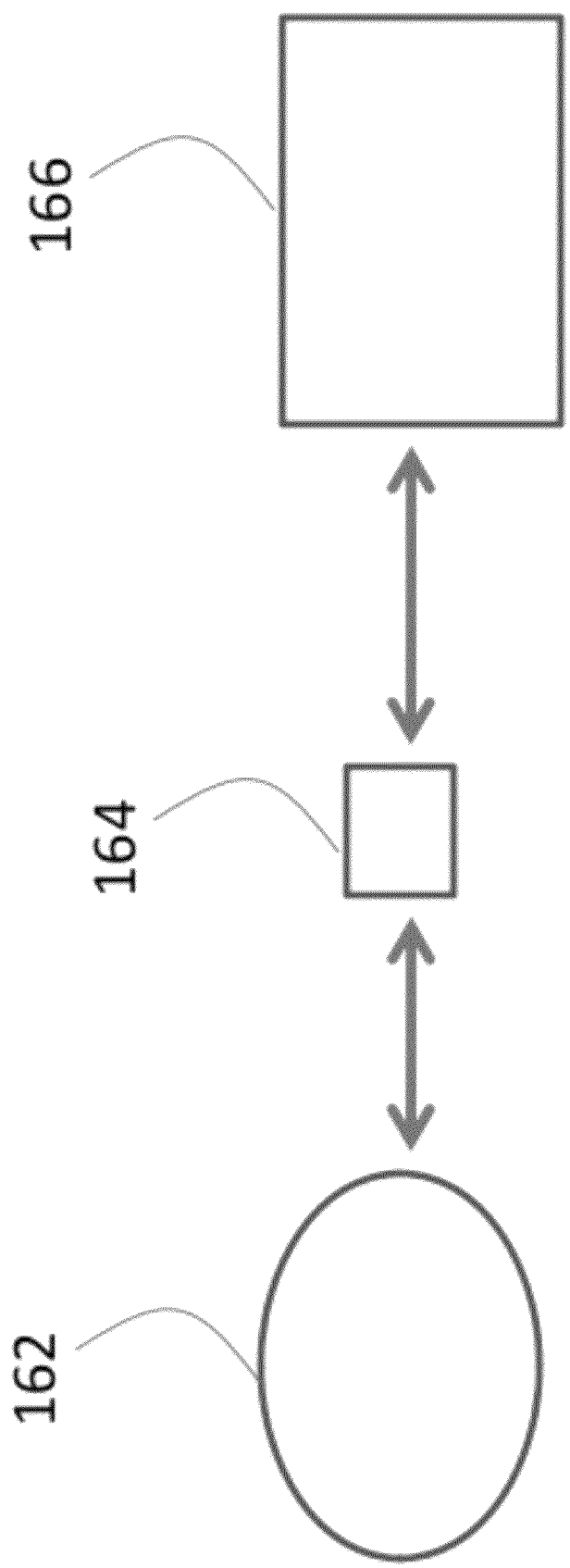

ASPIRATED IMPELLER

FIELD OF THE INVENTION

The present invention generally relates to gas turbine engine impellers, and more particularly, but not exclusively, to gas turbine engine centrifugal compressor impellers having openings for flowing fluid.

BACKGROUND

Centrifugal impellers used in gas turbine engines may be characterized as having a working surface and a base. Various structures may protrude from the working surface to change the pressure of a traversing working fluid. In some operational situations, the flow conditions on the working surface of the impeller lead to inefficiencies or instabilities. Accordingly, there remains a need for further contributions in this area of technology.

SUMMARY

One embodiment of the present invention is a unique centrifugal impeller. Other embodiments include apparatuses, systems, devices, hardware, methods, and combinations for flowing fluid through at least a portion of a centrifugal impeller. Further embodiments, forms, features, aspects, benefits, and advantages of the present application shall become apparent from the description and figures provided herewith.

BRIEF DESCRIPTION OF THE FIGURES

FIG. 6 is a view of one embodiment of the instant application.

DETAILED DESCRIPTION OF REPRESENTATIVE EMBODIMENTS

Figure 1:
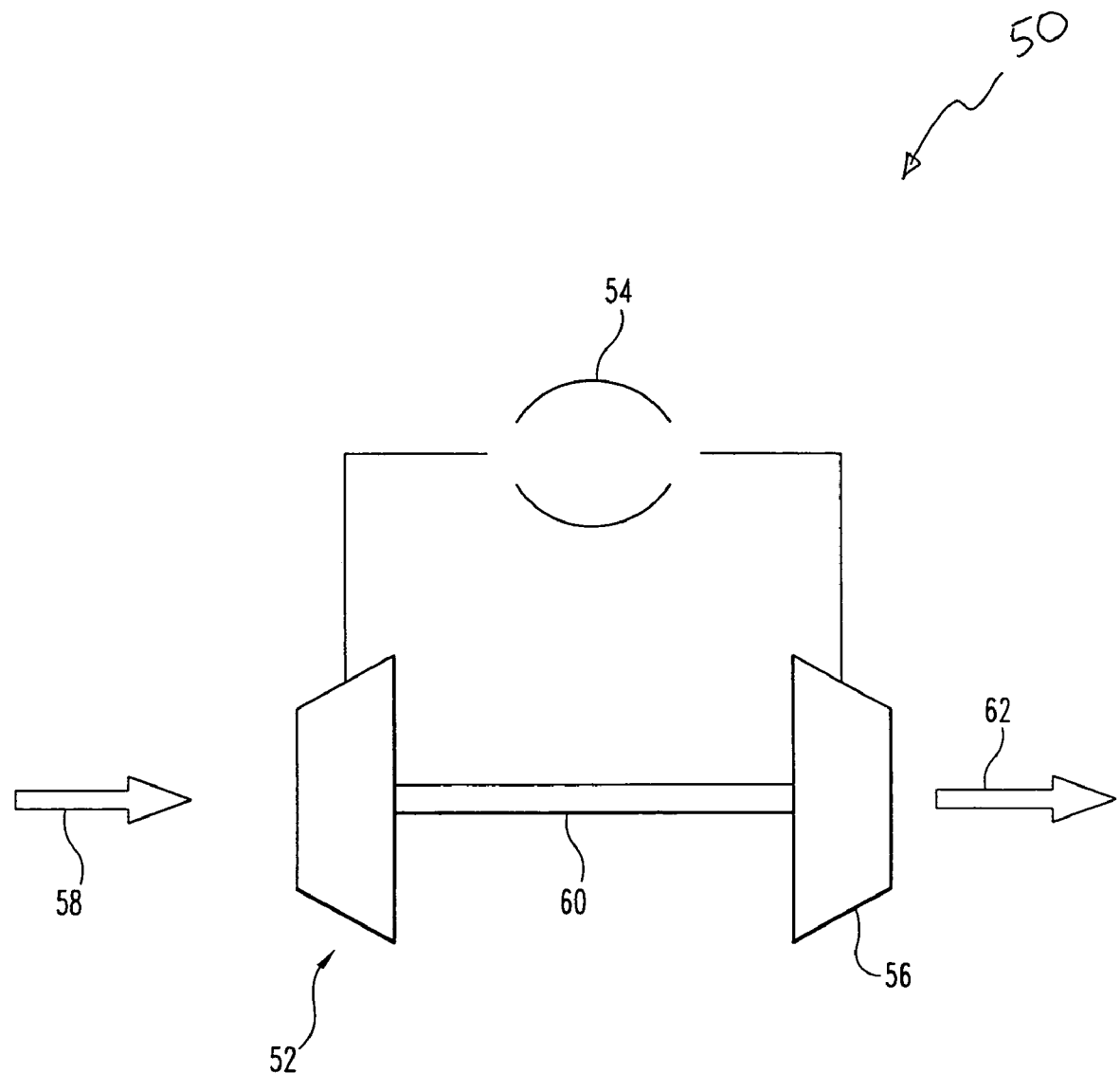
FIG. 1 is a schematic illustration of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is set forth a schematic illustration of a gas turbine engine 50 that may be used to provide power to an aircraft. The term "aircraft" includes, but is not limited to, helicopters, airplanes, unmanned aerospace vehicles, fixed wing vehicles, missiles, variable wing vehicles, rotary wing vehicles, hover crafts, tilt-wing vehicles, tilt-rotor vehicles, and others. Further, the present inventions are contemplated for utilization in other applications that may not be coupled with an aircraft such as, for example, industrial applications, power generation, pumping sets, naval propulsion and other applications known to one of ordinary skill in the art.

In one form gas turbine engine 50 includes a centrifugal compressor 52, a combustor 54, and a turbine 56. A working fluid 58, such as an air stream, is compressed by the centrifugal compressor 52 and mixed with fuel before being burned in the combustor 54 to create a stream of working fluid and products of combustion. The turbine 56 is oriented downstream of the combustor 54 to extract energy from the stream exiting the combustor 54 and use at least part of the energy to drive the centrifugal compressor 52 through a shaft 60. An exhaust flow 62 exits the turbine 56 to provide propulsive force to the aircraft. The gas turbine engine 50 is not limited to the form illustrated in FIG. 1; other embodiments are also contemplated herein. For example, one embodiment of the gas turbine engine 50 may include a hybrid axial-centrifugal compressor section.

Figure 2:
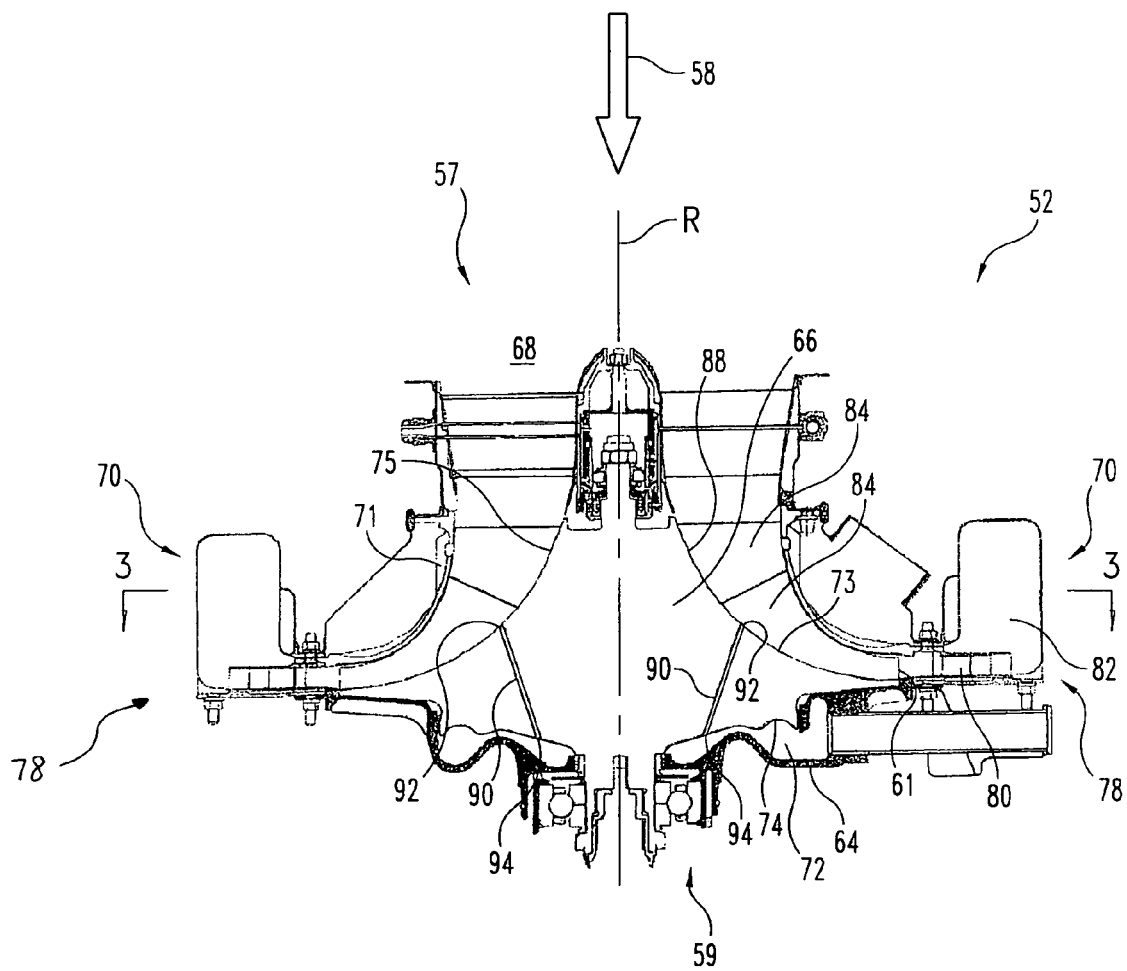
FIG. 2 is a side view of a centrifugal compressor.

Turning now to FIG. 2, a cross section of one form of the centrifugal compressor 52 from FIG. 1 is shown. The centrifugal compressor 52 includes an impeller 66, an inlet 68, an outlet 70, a shroud 71, and a casing 64. On a front side 57 of the impeller 66, a flow path extends from the inlet 68 to the outlet 70 and is defined between the shroud 71 and an inner flow path surface 73 of a frustum-conical shaped hub 75 of impeller 66. In some embodiments, the hub 75 of the impeller 66 may have shapes other than frustum-conical. On a back side 59 of the impeller 66, a cavity 72 is disposed between a back surface 74 of the impeller 66 and the casing 64, but in other embodiments the cavity 72 may be disposed between the back surface 74 and other structures. One or more of conduits 90 are defined within the impeller 66 to provide a fluid communication between the front side 57 and the back side 59 of the impeller 66. In some embodiments, however, the conduit 90 may provide a fluid communication between other sides of the impeller 66. For example, a conduit 90 may be defined between a discharge side 61 of the impeller 66 and any of the other sides.

In one form, the inlet 68 is used to capture and direct the working fluid 58 as it enters the gas turbine engine 50. The inlet 68 can take on a variety of shapes and may extend any distance either along or off-axis of the axis of rotation R.

The outlet 70 is located at a downstream end 78 of the impeller 66 to convey working fluid 58 that has been compressed by the impeller 66. In some forms the outlet 70 includes a diffuser 80 and a scroll 82 to decelerate the compressed working fluid and convert the loss in velocity to an increase in static pressure. The present application contemplates that the diffuser 80 can be of any configuration and may or may not include diffuser vanes.

In one form the impeller 66 includes a series of airfoils 84 defined in the front side 57 of the impeller 66. As used herein, the term "airfoil" includes structures capable of manipulating an incoming flow of air or working fluid, either by splitting the flow, inducing the flow, or increasing the velocity and/or pressure of the flow. In operation, the airfoils 84 rotate with the impeller 66 around the axis of rotation R to compress the working fluid 58. The airfoils 84 may have a variety of shapes, configurations, and/or properties, including forward sweep, backward sweep, and rake angle, among others. As used herein, the term "airfoil" includes any structure useful to direct and/or otherwise increase the pressure of the working fluid flowing through the compressor 52. Such structures may include compressor blades, compressor blades having inducer sections, and splitter vanes that may be used between blades, among possible others.

The conduit 90 may be formed in the impeller 66 and in the illustrative embodiment extends from an inner flow surface 88 to the back surface 74. In other embodiments, the conduit 90 may also extend between any parts of the impeller 66. The conduit 90 may be sized to convey working fluid at a variety of flow rates and at a variety of temperatures and pressures. As will be described further below, some conduits may pass working fluid from the inner flow surface 88 to the back surface 74, while other conduits may convey working fluid from the back surface 74 to the inner flow surface 88. Although two conduits 90 are depicted in the illustrative embodiment, any number of conduits may also be used. The conduit 90 includes a front side aperture 92 and a back side aperture 94 which permits the inner flow surface 88 to be in fluid communication with the cavity 72. The conduit 90 may have a variety of lengths and cross sectional shapes and may include bends and/or turns necessary to convey working fluid between the inner flow surface 88 and the back surface 74. In some embodiments, the conduit 90 may be curvilinear or may have a series of discontinuous shapes, to set forth just two non-limiting examples of alternative routing between the inner flow surface 88 and the back surface 74. In other embodiments, the conduit 90 may have a cross sectional shape that varies over the length of the conduit 90 as it traverses between the inner flow surface 88 and the back surface 74. For example, the conduit 90 may have a cross sectional shape that is circular over a portion of the length of the conduit 90 and a rectilinear cross sectional shape over the remaining portion of the length. Other shapes and combinations of shapes are also contemplated.

In one form the cavity 72 is a transit point or location in which working fluid collects when being conveyed between the inner flow surface 88 and the back surface 74. The cavity 72 can include working fluid at a variety of pressures that can be the same as, greater than, or less than the pressure at the front side aperture 92. The cavity 72 may also include working fluid at a variety of temperatures. A pressure source or pressure sink may be disposed in fluid communication with the cavity 72 in some embodiments. Examples of such pressure sources or sinks include a relatively high pressure tank, a compressor discharge exit, a vacuum pump, and the ambient atmosphere, to set forth just a few non-limiting examples. In some embodiments, a regulator or valve may be used to regulate/control/modulate the flow rate of working fluid between the cavity 72 and the front side 57. The regulator may be located at any suitable location in a flow path and may include any type of suitable valve, orifice, or other flow restricting or regulating devices. One embodiment is shown in FIG. 6 in which a regulator 162 is disposed between a pressure region 164 and impeller 166, in which the pressure region 164 can be a source or a sink consistent with the description herein. In other embodiments, the cavity 72 may be coupled with a conduit that conveys working fluid to or from another flow path location within the gas turbine engine 50.

Figure 3:
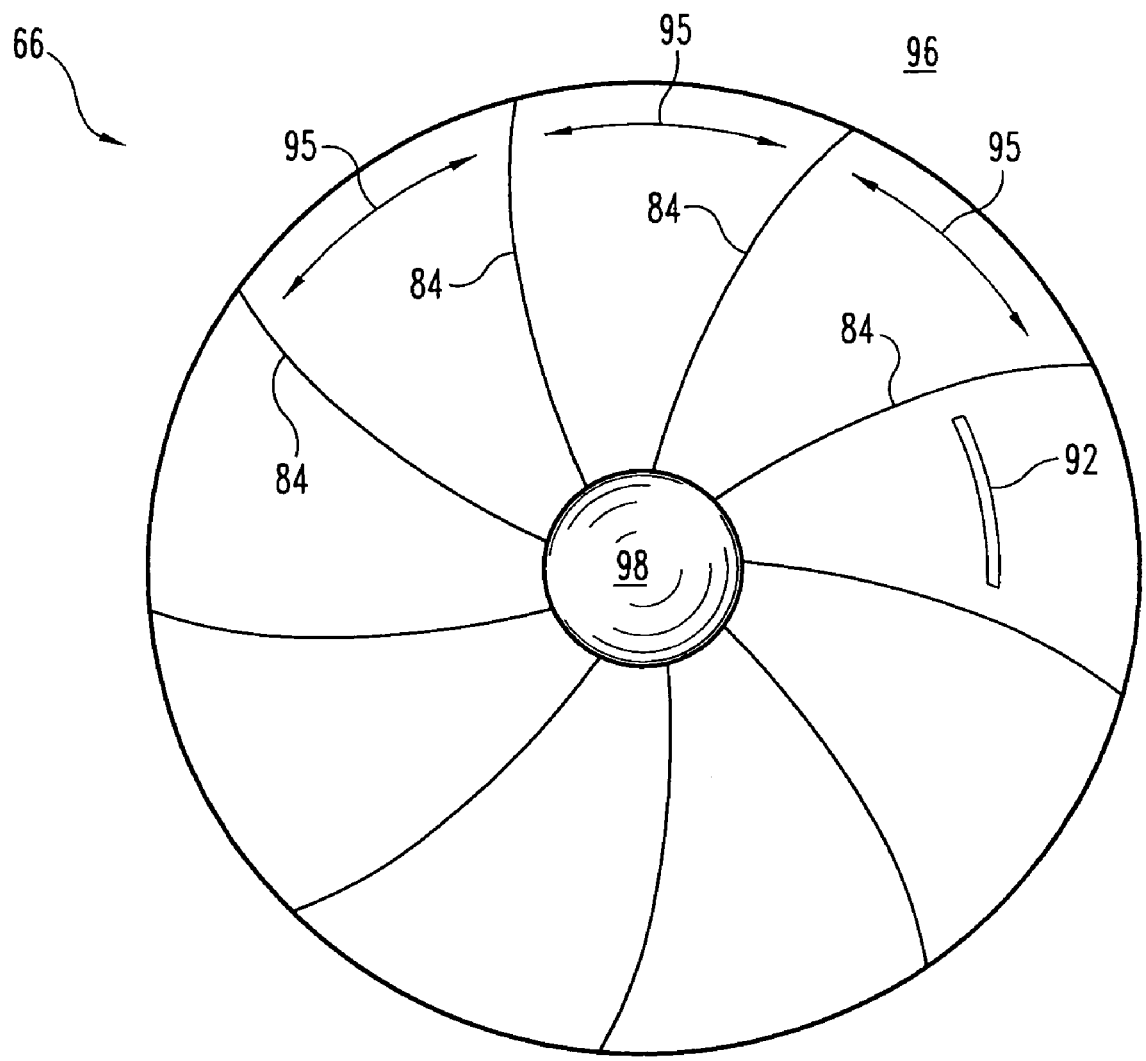
FIG. 3 is a view along line 3-3 of FIG. 2.

FIG. 3 depicts a view of the impeller 66 taken along line 3-3 of FIG. 2. The airfoils 84 can be seen extending from a bore region 98 of the impeller 66 to a tip region 96. In some embodiments, some or all of the airfoils 84 only partially extend from the tip region 96 to the bore region 98. A pitch 95 may be located between the airfoils 84 and is an area generally free from airfoils or other like structures. The pitch 95 may also curve upward from the tip region 96 to the bore region 98 as may be seen in FIG. 2. A number of equispaced airfoils 84 are depicted in FIG. 3 such that the pitch 95 between the airfoils 84 is the same. Some impellers 66 however, may not have equispaced airfoils 84.

The front side aperture 92 is shown in one form in FIG. 3 as a generally elongate slot and is operable to convey working fluid between the front side 57 and the back side 59, as was discussed above. The front side aperture 92 may have any number of other shapes in other embodiments. For example, one embodiment includes the front side aperture 92 having a circular cross section, to set forth just one non-limiting alternative. In addition, though the front side aperture 92 may be located within the pitch 95, some embodiments include one or more front side apertures 92 located in one or more of the airfoils. For example, one location of a front side aperture 92 in the airfoil 84 of the illustrated embodiment can be on the suction side or the pressure side, among possible other locations. The illustrative embodiment depicts a single front side aperture 92 located within the pitch 95 of the impeller 66, but other embodiments include multiple front side apertures 92 located within the same pitch 95. For example, an aperture having a similar, elongate slot may be located within the same pitch as the front side aperture 92 but closer to the bore region 98. As another example, an array of circular-shaped apertures may be located within the same pitch as the front side aperture 92. In embodiments having multiple apertures located within the same pitch, and specifically those embodiments having multiple apertures with the same shape, not all apertures need be the same size. For example, some apertures of an array of circular-shaped apertures may have varying exit areas such that some apertures are smaller or larger than others. In still further embodiments, apertures 92 may be distributed in each pitch 95 of the impeller 66, or may be distributed in fewer locations. For example, apertures 92 may be distributed in every other pitch 95, or may be distributed unevenly.

Various configurations of the conduits may be provided within the impeller. For example, a single conduit may be formed to service multiple apertures that may be located within a single pitch, or may span across multiple pitches and possibly include airfoils. In other embodiments, a single pitch may have multiple front side apertures such that may be served individually by multiple conduits. In yet another example, multiple back side apertures and multiple front side apertures may be in fluid communication with a single plenum formed within the impeller.

Figure 4:
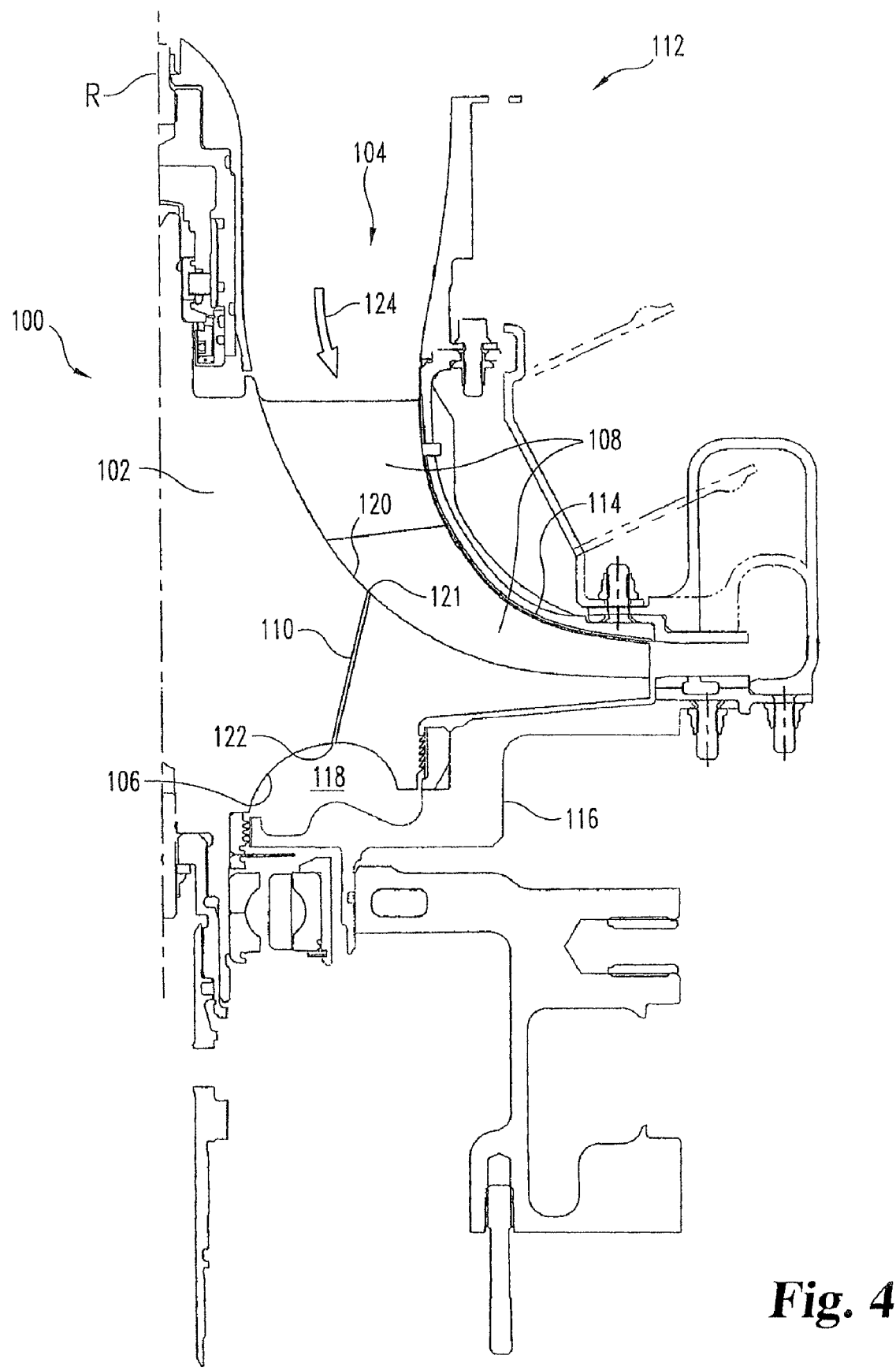
FIG. 4 is a partial side view of a centrifugal compressor.

FIG. 4 depicts a partial side view of one embodiment of an impeller 100. The impeller 100 is operable to rotate about an axis R and includes a hub 102, a front side 104, a back side 106, airfoils 108, and a conduit 110. The impeller 100 is disposed in a compressor 112 between a shroud 114 and a casing 116. A cavity 118 is formed between the back side 106 of the impeller 100 and an inner flow path surface 120.

The conduit 110 may be defined in the impeller 100 between the front side 104 and the back side 106. The conduit 110, furthermore, may include a front side aperture 121 and a back side aperture 122 and may take on any of the forms of the various embodiments described hereinabove.

In operation, the conduit 110 allows relatively high pressure working fluid from a flow path 124 to flow into the cavity 118 which may be held at pressures near the local atmospheric pressure. Because the flow path 124 is at a higher pressure than the cavity 118, the working fluid will flow from the front side 104 to the back side 106 via the conduit 110. The suction from the front side 104 to the back side 106 may remove low momentum fluid from the flow path 124 in proximity to the hub 102 and possibly the airfoils 108 before low momentum fluid enters a high static pressure gradient. By doing so, this reduces secondary flows or three-dimensional flows and thus reduce flow path blockage and improve efficiency.

Some cavities of existing gas turbine engines provide a similar cavity 118 which may have pressures near the local atmospheric pressure. The impeller embodiment described herein, therefore, can be used with existing cavities.

Figure 5:
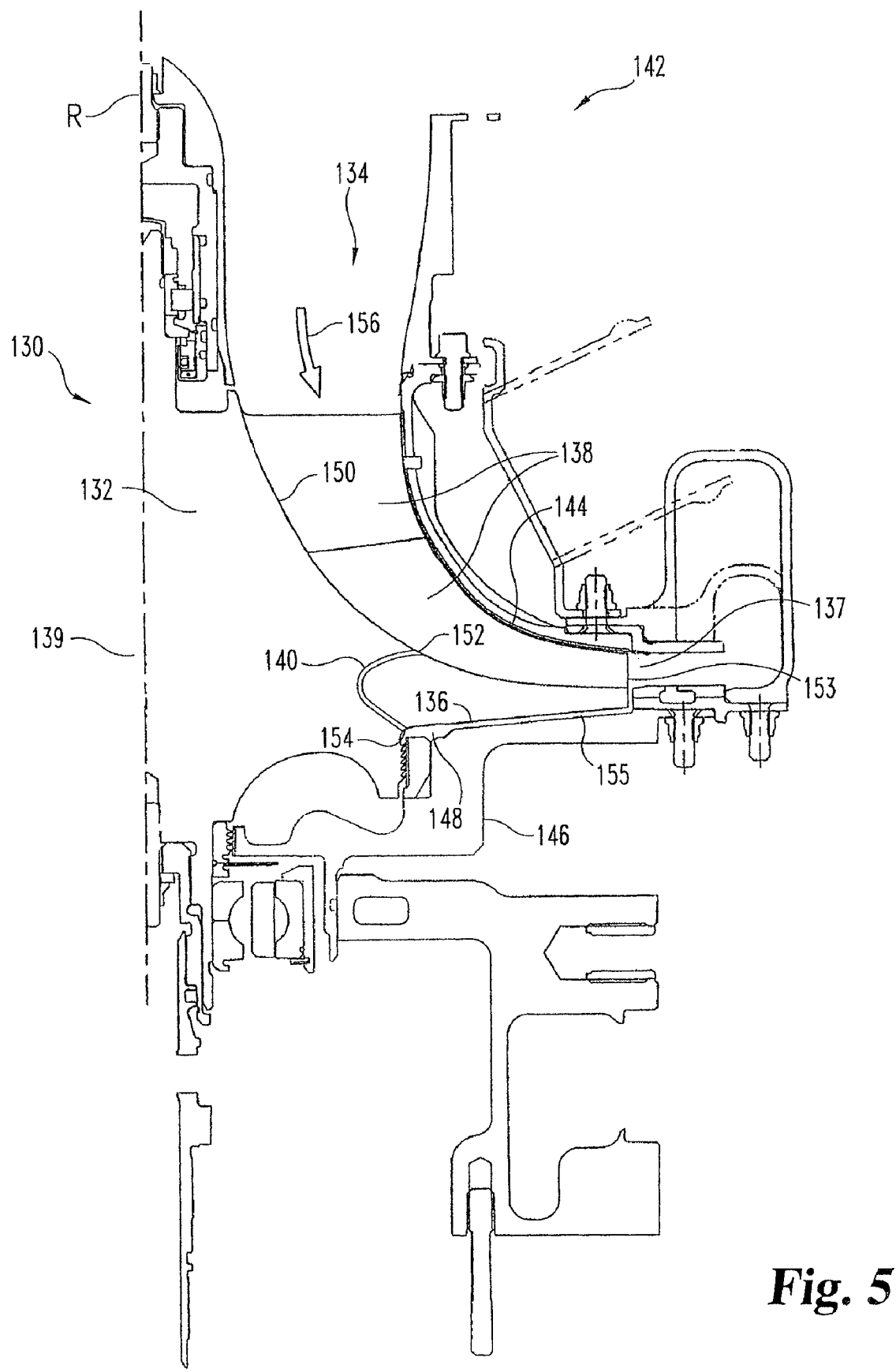
FIG. 5 is a partial side view of a centrifugal compressor.

FIG. 5 depicts a partial side view of another embodiment of an impeller 130. The impeller 130 is operable to rotate about an axis R and in one form includes a hub 132, a front side 134, a back side 136, airfoils 138, and a conduit 140. The impeller 130 is disposed in a compressor 142 between a shroud 144 and a casing 146.

In one form the conduit 140 is included in the impeller 130 between the front side 134 and the back side 136. The conduit 130 may include a front side aperture 152 and a back side aperture 154 and may take on any of the forms of the various embodiments described hereinabove.

A cavity 148 is formed between the back side 136 of the impeller 130 and an inner flow path surface 150. Pressurized working fluid is supplied to the cavity 148 from a compressor discharge 153 via a space 155 that extends from a tip region 137 to a hub region 139 disposed between the backside 136 and the casing 146. Other passage configurations are possible in other embodiments. For example, a passage may be defined between the cavity 148 and a point further downstream than the compressor discharge 153.

In operation, the conduit 140 allows relatively high pressure working fluid from the cavity 148 to be injected, or otherwise added to, a flow path 156 on the front side 134 of the impeller 130. Adding relatively high pressure working fluid to the front side 134 of the impeller 130 can re-energize low momentum fluid flow which leads to reduced secondary flows and three-dimensional flows that contribute to flow path blockage.

Some existing gas turbine engines provide a cavity similar to the cavity 148 depicted in FIG. 5. The embodiment described herein, therefore, are useful with existing cavities.

One embodiment of the present application includes a centrifugal compressor configured to supply compressed working fluid to a combustor of a gas turbine engine. The centrifugal compressor includes a compressor casing and an impeller. A series of blades are formed in a front side of the impeller. A conduit is formed in the impeller and is configured to convey working fluid between the front side and the back side. A cavity is formed on the back side between the impeller and the casing and can be selectively pressurized such that working fluid is forced to flow from the front side to the back side of the impeller, or vice versa. The conduit is used to either remove low momentum flow from the flow path internal to the centrifugal compressor, or to add flow momentum to the flow path.

Another embodiment of the present application includes a gas turbine engine impeller operable to provide a momentum flow of working fluid, the gas turbine engine impeller having a first side and a second side, the first side including a plurality of airfoils, the impeller also including a passageway traversing between the first side and the second side, the passageway capable of conveying air and altering the momentum flow on the first side of the impeller.

A further embodiment of the present application includes an apparatus comprising a turbomachinery impeller having a first side, a second side, and a frustum-conical hub, the first side operable to change the pressure of a working fluid, and a conduit in the turbomachinery impeller between the first side and the second side, the conduit operable to convey the working fluid.

Yet a further embodiment of the present application includes an apparatus comprising a gas turbine engine having a rotatable impeller, the rotatable impeller including a first side and a second side, the first side including a plurality of airfoils useful for compressing working fluid entering the housing inlet and operative for creating a momentum flow within the housing, and means for flowing working fluid between the first side and second side of the rotatable impeller.

Yet another embodiment of the present invention includes a method for altering a low momentum flow condition in a centrifugal compressor, the method comprising: rotating a gas turbine engine compressor impeller, flowing a working fluid into the gas turbine engine compressor impeller, and conveying working fluid through a conduit that traverses between a first side of the impeller and a backside of the impeller.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
a gas turbine engine including a flow path therethrough;
a gas turbine engine impeller disposed in the flow path and operable to provide a momentum flow of working fluid, the gas turbine engine impeller having a first side and a second side, the first side including a plurality of airfoils, the gas turbine engine impeller also including a passageway traversing between the first side and the second side, the passageway capable of conveying air and altering the momentum flow on the first side of the impeller,
wherein the second side is in fluid communication with a relatively low pressure sink such that air is conveyed from the first side to the second side during operation of the gas turbine engine.

2. The apparatus of claim 1, wherein the working fluid is conveyed through the passageway from the first side to the second side so as to remove a low momentum portion of the momentum flow on the first side of the gas turbine engine impeller.

3. The apparatus of claim 1, wherein the first side further includes a slot shaped aperture.

4. The apparatus of claim 1, wherein the passageway extends between a first side aperture and a second side aperture.

5. The apparatus of claim 1, wherein the gas turbine engine impeller includes a plurality of passageways.

6. The apparatus of claim 1, wherein the gas turbine engine impeller includes a pitch between the airfoils, the pitch having a plurality of apertures.

7. The apparatus of claim 1, which further includes a seal disposed between a second side portion of the passageway and a compressor discharge to discourage high pressure air from the compressor discharge to enter the passageway.

8. An apparatus, comprising:
a gas turbine engine having a combustor capable of combusting a mixture of fuel and air;

a gas turbine engine impeller disposed in the gas turbine engine having a first side, a second side, and a frustum-conical hub, the first side operable to change a pressure of a working fluid;

a conduit in the gas turbine engine impeller between the first side and the second side, the conduit operable to convey the working fluid; and a passageway configured between a pressure source and the conduit and substantially free from a flow impeding seal wherein the working fluid can traverse from the pressure source and exit the second side of the impeller from the conduit.

9. The apparatus of claim 8, which further includes a housing having an inlet and an outlet, the inlet and outlet operable to pass the working fluid, the impeller located within the housing.

10. The apparatus of claim 9, further comprising a cavity formed between the second side of the impeller and the housing, the cavity operable to provide a pressure volume for the conduit to convey the working fluid between the first side and second side.

11. The apparatus of claim 8, wherein the impeller is a compressor impeller.

12. The apparatus of claim 9, wherein compressor discharge working fluid is supplied to the conduit.

13. The apparatus of claim 8, which further includes a regulator to regulate the working fluid traversing between the first side and second side to improve part speed stability margin.

14. The apparatus of claim 8, wherein the gas turbine engine impeller includes a plurality of apertures formed in the first side.

15. The apparatus of claim 14, wherein the passageway provides fluid to the plurality of apertures.

16. An apparatus, comprising:

a gas turbine engine having a rotatable impeller, the rotatable impeller including a first side and a second side, the first side including a plurality of airfoils useful for compressing working fluid entering a housing inlet and operative for creating a momentum flow within the housing; and means for flowing the working fluid from the first side to the second side of the rotatable impeller.

17. A method for altering a low momentum flow condition in a centrifugal compressor, the method comprising:

rotating a gas turbine engine compressor impeller during operation of the gas turbine engine centrifugal compressor;

flowing a working fluid into the gas turbine engine compressor impeller; and routing the working fluid to enter a conduit before encountering a seal, the conduit formed between a first side of the gas turbine engine compressor impeller and a backside of the impeller conveying working fluid through the conduit to the first side from the backside of the impeller.

18. The method of claim 17, which further includes pressurizing a cavity on the backside of the impeller.

19. The method of claim 17, which further includes altering a flow field on the first side of the impeller during the conveying working fluid.

20. The method of claim 17, which further includes regulating the working fluid flow through the conduit.

\* \* \* \* \*